United States Patent
Chudy et al.

(10) Patent No.: US 9,443,221 B2
(45) Date of Patent: Sep. 13, 2016

(54) PHYSICAL LOCATION TAGGING VIA IMAGE RECOGNITION

(71) Applicant: International Business Machines Corporation, Armonk, NY (US)

(72) Inventors: David D. Chudy, Raleigh, NC (US); James G. McLean, Fuquay-Varina, NC (US); Cristian Medina, Durham, NC (US); Michael T. Shelton, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 387 days.

(21) Appl. No.: 14/106,998

(22) Filed: Dec. 16, 2013

(65) Prior Publication Data

US 2015/0170095 A1    Jun. 18, 2015

(51) Int. Cl.
| G06Q 10/00 | (2012.01) |
| G06Q 10/08 | (2012.01) |
| H04N 7/18 | (2006.01) |
| G06K 17/00 | (2006.01) |

(52) U.S. Cl.
CPC ............ *G06Q 10/087* (2013.01); *H04N 7/183* (2013.01); *G06K 2017/0051* (2013.01)

(58) Field of Classification Search
CPC .................................................. G06Q 10/087
USPC ......................................................... 348/143
See application file for complete search history.

(56) References Cited

U.S. PATENT DOCUMENTS

| 7,856,495 B2 | 12/2010 | Chainer et al. |
| 2011/0191454 A1* | 8/2011 | Joukov ................ G06F 15/173 709/223 |
| 2012/0249588 A1 | 10/2012 | Tison et al. |

FOREIGN PATENT DOCUMENTS

JP    2006-309481    11/2006

OTHER PUBLICATIONS

IPCOM000214909D: "Method and System for Managing Infrastructure of a Data Center via a Mobile" Disclosed Anonymously, Feb. 10, 2012.

* cited by examiner

*Primary Examiner* — Jeffery Williams
(74) *Attorney, Agent, or Firm* — Steven M. Greenberg, Esq.; CRGO Law

(57) ABSTRACT

Embodiments of the invention provide a method, system and computer program product for physical location tagging via image recognition of physical components in a data center. The method includes acquiring an image scan of a field of view of a camera at a known location in a data center and matching an image of a device in the image scan to a pre-stored image of a similar device to determine a device type of the device in the image scan. The method also includes transmitting a directive to a known device in inventory of the determined device type to activate a visual indicator disposed on an exterior portion of the known device. Finally, the method includes re-acquiring the image scan to detect an activated visual indicator on the device in the image scan and, in response, mapping the known location in the data center to the known device in inventory.

15 Claims, 2 Drawing Sheets

PHYSICAL LOCATION TAGGING VIA IMAGE RECOGNITION

BACKGROUND OF THE INVENTION

1. Field of the Invention

The present invention relates to inventory management in a data center and more particularly to locating physical resources in a data center.

2. Description of the Related Art

A data center is a facility used to house computer systems and associated components, such as telecommunications and storage systems. The typical data center generally includes not only a multiplicity of servers, both stand alone and rackmount, but also communication switching devices, redundant or backup power supplies, environmental controls including air conditioning and fire suppression and security devices. Oftentimes, different sets of servers and associated switches are stored in cabinets within the data center or on racks in the data center, with those cabinets or racks organized in rows just as may be the case with bookshelves in a library.

In any datacenter environment, it is necessary to track the location of each physical hardware component for several reasons. However, the location of a hardware component in a datacenter can differ from a specific rack or cabinet number in a particular location, to a slot within a chassis located in a specific rack or cabinet in a particular location. Current solutions address the complexity of locating individual hardware components in the data center through the utilization of several technologies such as universal product codes (UPC) and radiofrequency identification (RFID) tags. Still, neither UPC codes nor RFID tags are tied to a specific location in the data center. In particular, when using an RFID reader sensing an RFID tag, the RFID reader only can indicate the proximity of the RFID to the reader. The RFID tag, however, cannot deliver its actual physical location in the data center to the RFID reader.

BRIEF SUMMARY OF THE INVENTION

Embodiments of the present invention address deficiencies of the art in respect to inventory management in the data center and provide a novel and non-obvious method, system and computer program product for physical location tagging via image recognition of physical components in a data center. In an embodiment of the invention, a method for physical location tagging via image recognition of physical components in a data center is provided. The method includes acquiring an image scan of a field of view of a camera at a known location in a data center and matching an image of a device in the image scan to a pre-stored image of a similar device to determine a device type of the device in the image scan. The method also includes transmitting a directive to a known device in inventory of the determined device type to activate a visual indicator disposed on an exterior portion of the known device. Finally, the method includes re-acquiring the image scan to detect an activated visual indicator on the device in the image scan and, responsive to detecting the activated visual indicator, mapping the known location in the data center to the known device in inventory.

In another embodiment of the invention, a data processing system is configured for physical location tagging via image recognition of physical components in a data center. The system includes a camera, an image store of pre-stored imagery of devices of corresponding device types and a physical location tagging module executing in memory of a computer. The module includes program code enabled to direct the camera to acquire an image scan of a field of view of the camera at a known location in a data center, to match an image of a device in the image scan to a pre-stored image in the image store to determine a device type of the device in the image scan, to transmit a directive to a known device in inventory of the determined device type to activate a visual indicator disposed on an exterior portion of the known device, to direct the camera to re-acquire the image scan to detect an activated visual indicator on the device in the image scan, and responsive to detecting the activated visual indicator, to map the known location in the data center to the known device in inventory.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for physical location tagging via image recognition of physical devices in a data center. In accordance with an embodiment of the invention, a camera of a tagging system can be positioned within view of a physical location of a data center, for example at a position proximate to a cabinet or rack. Once the camera has been positioned, the tagging system can direct the camera to scan the field of vision of the camera and acquire imagery of the hardware devices within the field of vision of the camera. The acquired imagery can be compared to a database of known device imagery so as to identify device types at the physical location. Thereafter, the target system can direct all hardware devices in inventory matching the identified device types to activate a visual indicator present on an external portion of the hardware devices and the camera can detect an activated visual indicator of one or more of the hardware devices. Consequently, the physical location of the data center can be mapped in an inventory management record to the specific hardware devices upon which the activated visual indicator is detected.

Figure 1:
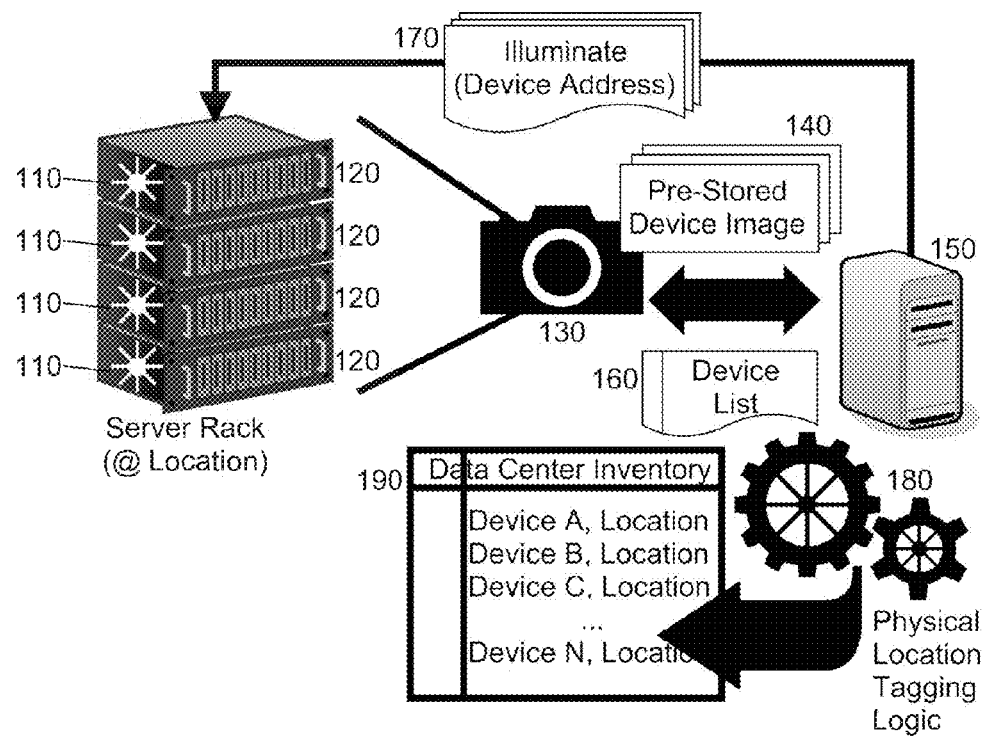
FIG. 1 is a pictorial illustration of a process for physical location tagging via image recognition of physical components in a data center.

In further illustration, FIG. 1 is a pictorial illustration of a process for physical location tagging via image recognition of physical devices in a data center. As shown in FIG. 1, a camera 130 can acquire an image of different hardware devices 120 disposed in a particular location, such as within a server rack within a particular location of a data center. The image can be compared to different pre-stored images 140 of different devices and a list 160 of matching imagery can be processed by physical location tagging logic 190 of a server 150. Specifically, the matching imagery of the list 160 can indicate one or more types of devices present in the particular location.

Thereafter, the server 150 can transmit a directive 170 to all devices in the data center matching the device types present in the particular location to illuminate a visual indicator 110 present on an external portion of the devices, for example one or more LEDs indicating a state of a corresponding one of the devices. Subsequent to the direction of the server 150, the camera 130 again can acquire an image of the different hardware devices 120 so as to identify one or more of the devices with an illuminated visual indicator 110. For each of the devices 120 for which an illuminated visual indicator 110 is detected by the camera 130, the physical location tagging logic 180 can write a record within a table of data center inventory 190 specifying the physical location of the devices 120 for which the illuminated visual indicator 110 was detected by the camera 130.

Figure 2:
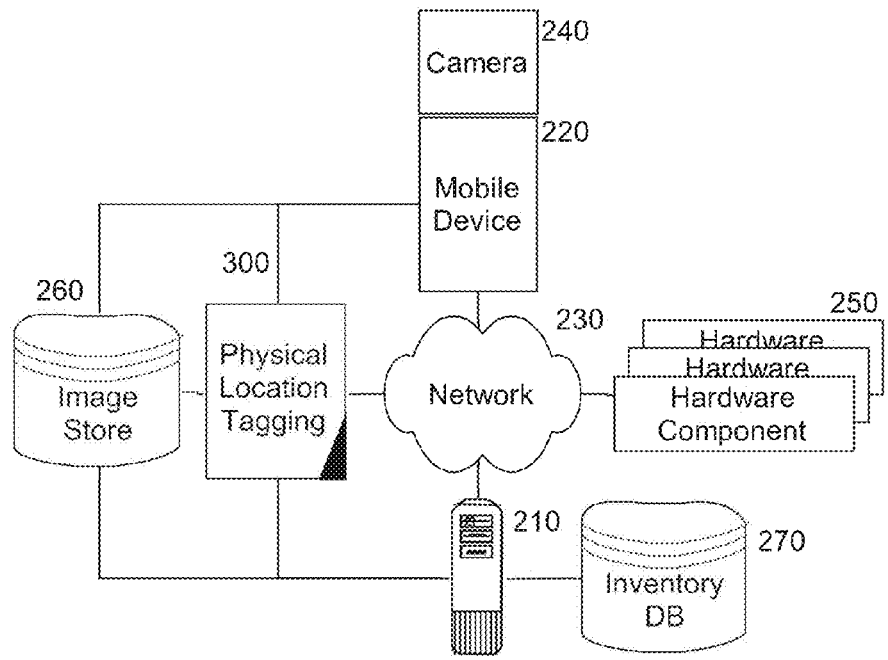
FIG. 2 is a schematic illustration of a data processing system configured for physical location tagging via image recognition of physical components in a data center; and, FIG. 3 is a flow chart illustrating a process for physical location tagging via image recognition of physical components in a data center.

The process described in connection with FIG. 1 can be implemented in a data processing system. In more particular illustration FIG. 2 is a schematic illustration of a data processing system configured for physical location tagging via image recognition of physical components in a data center. The system can include a host computing system 210 with memory and at least one processor coupled to a mobile device 220 over a computer communications network 230, such as the Internet, a point to point wireless link or over a local area network. The mobile device 220 can include a camera 240. In this regard, the mobile device 220 can be a stand alone digital camera, or a smart phone, tablet or portable computer. An inventory database 270 can be coupled to the computer communications network 230. The inventory database 270 can include records of different hardware devices 250 disposed within a data center.

Of note, physical location tagging module 300 can be coupled both to the mobile device 220 and the host computing system 210. In one aspect of the embodiment, the physical location tagging module 300 can execute in memory of the mobile device 220. In another aspect of the embodiment, the physical location tagging module 300 can execute in memory of the host computing system 210. In either case, the physical location tagging module 300 can include program code that when executed in the memory of a computer, compares imagery acquired by the camera 240, at a particular location in the data, to images in image store 260 in order to identify device types present in the field of view of the camera 240.

The program code additionally can be enabled upon execution in the memory of a computer to direct the transmission of a directive to all devices of the identified device type, the directive causing an illumination of a visual indicator in each of the devices receiving the directive. The program code yet further can be enabled upon execution in the memory of the computer to process additional acquired imagery by the camera 240 to detect those of the devices of the identified device type with an illuminated visual indicator. Finally, the program code can be enabled upon execution in the memory of the computer to record a mapping of those of the devices with an illuminated visual indicator with a location associated with the mobile device 220.

Figure 3:
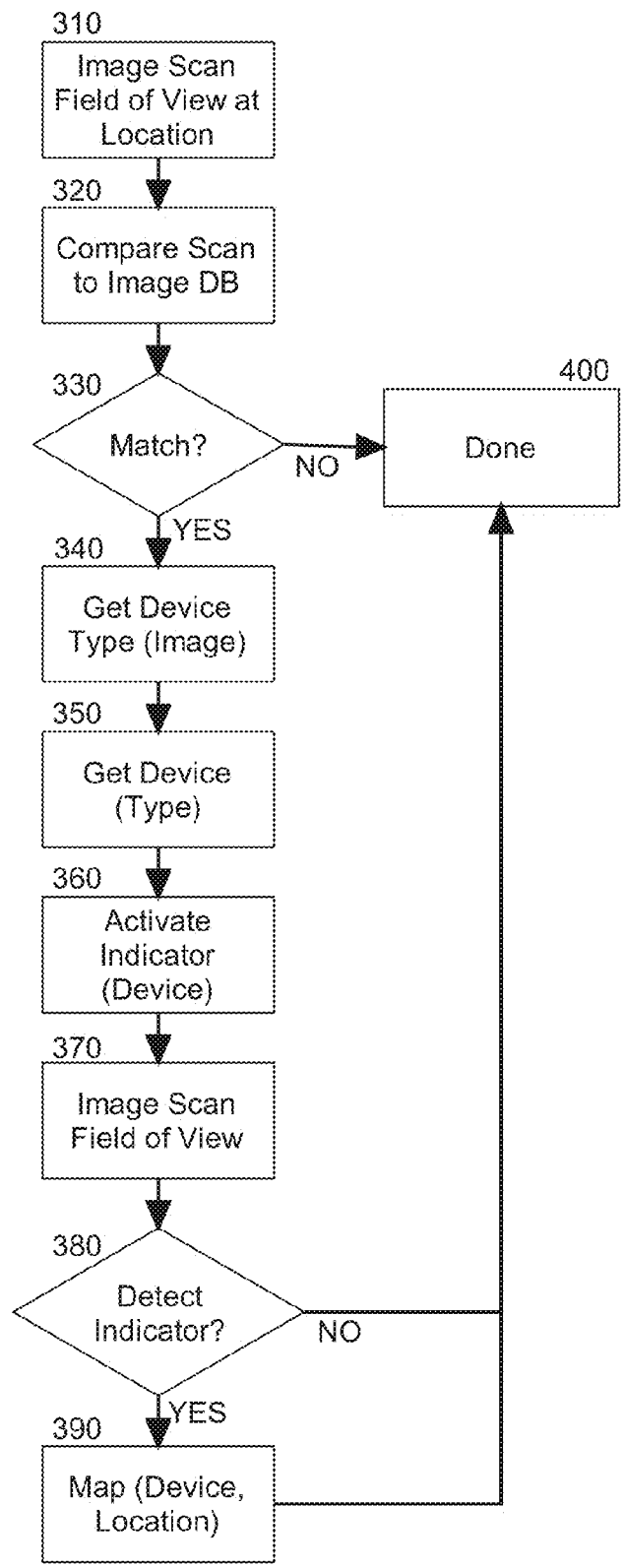

In even yet further illustration of the operation of the location tagging module 3, FIG. 3 is a flow chart illustrating a process for physical location tagging via image recognition of physical components in a data center. Beginning in block 310, an image scan of a field of view of a camera can be acquired at a known location in the data center. In this regard, at the time of activating the process of location tagging, an end user can provide an identity of the known location either through coordinates, or through the specification of a logical location by rack number or other location identifier in the data center.

In block 320, the image scan can be compared to a selection of pre-stored imagery in an image data store in order to determine whether or not the image scan matches an image in the image data store. Optionally, the end user can be prompted through the camera or associated smart phone to manipulate the field of view of the camera to better acquire usable imagery, for example by zooming the lens of the camera, or focusing upon particular text or a bar code of a device at the known location. In decision block 330, it can be determined whether or not the image scan matches an image in the image data store. If not, the process can end in block 400. Otherwise, the process can continue through block 340.

In block 340, a device type for the matching image in the image data store can be determined and in block 350, a device known to be in inventory in the data center of the same device type can be selected. Thereafter, in block 360, a visual indicator in the selected device can be activated by way of an electronic message transmitted to the selected device over a computer communications network. In this regard, the visual indicator can be any visually recognizable indicator on an exterior portion of the device, such as a drive light or LED, or a locate LED, to name two examples. Subsequently, in block 370 another image scan can be acquired for the known location.

In decision block 380, it can be determined from the new image scan whether or not a visual indicator is activated on the device in the new image scan. If not, the process can end 400. However, if the visual indicator is active and apparent within the new image scan, then in block 390, the known location of the image scan can be mapped to the selected device in an inventory table. Optionally, the new image scan also can acquire additional data present on an exterior portion of the selected device, such as a bar code or readable text.

Of note, the process described herein has been described in connection with the acquisition of an image of a single device. However, it will be apparent that the same process can be applied to multiple devices of the known location, simply by processing the scanned image to match at different portions of the scanned image, multiple different images of one or more device types in the image data store and to direct multiple different devices in inventory matching the one or more device types of the multiple different devices to activate corresponding visual indicators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for physical location tagging via image recognition of physical components in a data center, the method comprising:

acquiring an image scan of a field of view of a camera at a known location in a data center;

matching an image of a device in the image scan to a pre-stored image of a similar device to determine a device type of the device in the image scan;

transmitting a directive to a known device in inventory of the determined device type to activate a visual indicator disposed on an exterior portion of the known device;

re-acquiring the image scan to detect an activated visual indicator on the device in the image scan; and, responsive to detecting the activated visual indicator, mapping the known location in the data center to the known device in inventory.

2. The method of claim 1, wherein the camera is coupled to a smart phone.

3. The method of claim 1, wherein the camera is coupled to a tablet computer.

4. The method of claim 1, wherein the camera is coupled to a laptop computer.

5. The method of claim 1, wherein during acquisition of the image scan of the field of view of the camera at the known location in the data center, the end user is prompted to zoom into the field of view.

6. A data processing system configured for physical location tagging via image recognition of physical components in a data center, the system comprising:

a camera;

an image store of pre-stored imagery of devices of corresponding device types;

a physical location tagging module executing in memory of a computer, the module comprising program code enabled to direct the camera to acquire an image scan of a field of view of the camera at a known location in a data center, to match an image of a device in the image scan to a pre-stored image in the image store to determine a device type of the device in the image scan, to transmit a directive to a known device in inventory of the determined device type to activate a visual indicator disposed on an exterior portion of the known device, to direct the camera to re-acquire the image scan to detect an activated visual indicator on the device in the image scan, and responsive to detecting the activated visual indicator, to map the known location in the data center to the known device in inventory.

7. The system of claim 6, wherein the camera is coupled to a smart phone.

8. The system of claim 6, wherein the camera is coupled to a tablet computer.

9. The system of claim 6, wherein the camera is coupled to a laptop computer.

10. The system of claim 6, wherein during acquisition of the image scan of the field of view of the camera at the known location in the data center, the end user is prompted to zoom into the field of view.

11. A computer program product for physical location tagging via image recognition of physical components in a data center, the computer program product comprising:

a non-transitory computer readable storage medium having computer readable program code embodied therewith, the computer readable program code comprising:

computer readable program code for acquiring an image scan of a field of view of a camera at a known location in a data center;

computer readable program code for matching an image of a device in the image scan to a pre-stored image of a similar device to determine a device type of the device in the image scan;

computer readable program code for transmitting a directive to a known device in inventory of the determined device type to activate a visual indicator disposed on an exterior portion of the known device;

computer readable program code for re-acquiring the image scan to detect an activated visual indicator on the device in the image scan; and, computer readable program code for responding to detecting the activated visual indicator by mapping the known location in the data center to the known device in inventory.

12. The computer program product of claim 11, wherein the camera is coupled to a smart phone.

13. The computer program product of claim 11, wherein the camera is coupled to a tablet computer.

14. The computer program product of claim 11, wherein the camera is coupled to a laptop computer.

15. The computer program product of claim 11, wherein during acquisition of the image scan of the field of view of the camera at the known location in the data center, the end user is prompted to zoom into the field of view.

* * * * *